(12) United States Patent
Mast et al.

(10) Patent No.: US 8,341,114 B2
(45) Date of Patent: Dec. 25, 2012

(54) SYSTEM FOR UPDATING INFORMATION STORED ON A REMOTE DEVICE

(75) Inventors: Michael Mast, Howell, MI (US); Barry Lind, Manistee, MI (US); Tomas Ruzicka, Brno (CH)

(73) Assignee: Blackboard Inc., Washington, DC (US)

( * ) Notice: Subject to any disclaimer, the term of this patent is extended or adjusted under 35 U.S.C. 154(b) by 145 days.

(21) Appl. No.: 12/945,658

(22) Filed: Nov. 12, 2010

(65) Prior Publication Data

US 2012/0124111 A1     May 17, 2012

(51) Int. Cl.
*G06F 7/00* (2006.01)
*G06F 17/00* (2006.01)

(52) U.S. Cl. ............................................ 707/610

(58) Field of Classification Search .................... 707/610
See application file for complete search history.

(56) References Cited

U.S. PATENT DOCUMENTS

| | | | |
|---|---|---|---|
| 6,356,863 B1 * | 3/2002 | Sayle | 703/27 |
| 7,490,112 B1 * | 2/2009 | Suresh et al. | 1/1 |
| 2002/0174139 A1 * | 11/2002 | Midgley et al. | 707/204 |
| 2006/0206533 A1 * | 9/2006 | MacLaurin et al. | 707/200 |
| 2007/0041557 A1 * | 2/2007 | Chatterjee et al. | 379/218.01 |

\* cited by examiner

*Primary Examiner* — Charles Lu
(74) *Attorney, Agent, or Firm* — McDermott Will & Emery LLP

(57) ABSTRACT

In certain embodiments of the present disclosure, a system for storing data is provided. The system includes a processor that receives an application request to update a file on a server storage device, and generates, based on the request, a command to update the file on a server storage device. The system also includes a communications module that provides, to the server storage device, the command to update the file on the server storage device. The request is formatted for a file storage protocol of a client storage device, and the command is formatted for a file storage protocol of the server storage device. The command to update the file on the server storage device is not specific to the application generating the application request. Methods and computer-readable mediums are also provided.

27 Claims, 3 Drawing Sheets

| Rule | State of altered File A at Synchronization Time | Original Server Path | Action |
|---|---|---|---|
| 1 | Exists on server and client | A | PUT A |
| 2 | Exists on server and client | B | If B exists on client (i.e. if B was recreated) then   Put A   Else   PUT A, Delete B |
| 3 | Exists on server and client | Null | PUT A |
| 4 | Exists only on client | Null | PUT A |
| 5 | Exists only on client | B | If B exists on client (i.e. if B was recreated) then   PUT A   Else   MOVE B to A |
| 6 | Deleted from client but exists on server | A | Delete A |
| 7 | Deleted from client and does not exist on server | B | If B exists on server and B does not exist on client then   Delete B   Else   Do nothing |

FIG. 2

| Rule | State of altered File A at Synchronization Time | Original Server Path | Action |
|---|---|---|---|
| 1 | Exists on server and client | A | PUT A |
| 2 | Exists on server and client | B | If B exists on client (i.e. if B was recreated) then<br>    Put A<br>Else<br>    PUT A, Delete B |
| 3 | Exists on server and client | Null | PUT A |
| 4 | Exists only on client | Null | PUT A |
| 5 | Exists only on client | B | If B exists on client (i.e. if B was recreated) then<br>    PUT A<br>Else<br>    MOVE B to A |
| 6 | Deleted from client but exists on server | A | Delete A |
| 7 | Deleted from client and does not exist on server | B | If B exists on server and B does not exist on client then<br>    Delete B<br>Else<br>    Do nothing |

SYSTEM FOR UPDATING INFORMATION STORED ON A REMOTE DEVICE

BACKGROUND

1. Field

The present disclosure generally relates to computer networking, and specifically to updating information on a networked storage device.

2. Description of the Related Art

It is well known that information (e.g., data files) can be transferred from a client computer and stored onto a networked remote storage device, such as one stored at a server. Software applications on the client computer, however, are often configured to modify and store information stored locally (e.g., on a hard disk drive installed within the client computer). As a result, many client software applications lose and/or incorrectly alter information when attempting to store data files on a server, as will be seen from the following example.

For example, client computers often include word processing applications with a safe saving feature for files. The feature is intended to prevent information loss on a local file system in cases where an attempt to save the file is unexpectedly interrupted (e.g. by a system crash or power outage). If a user were working on an original document and had recently added new text to the original file, and the user then attempted to save the original file with the newly added text, then (1) the original file along with the new text would be saved as a new temporary file, (2) the original file would be renamed, (3) the temporary file would be renamed with the original file's name (thereby creating a file with the newly added text), (4) the creation date of the original file would be altered to match the renamed file, since the renamed file reflects the actual creation date of the original file, and (5) the renamed file would be deleted. To the user of the local file system it appears that the original file was simply saved with the newly added text, because steps (1)-(5) are not known to the user.

Unfortunately, these steps taken by the local file system are not compatible for storing data on many types of servers (e.g., servers having a Web-based Distributed Authoring and Versioning (WebDAV) environment) since attributes associated with the original file will be lost when the original file is moved, deleted, and/or replaced with a new file. Furthermore, many steps taken by the local file system (e.g., steps (1)-(5)) in attempting to store data on a server are unnecessary (e.g., duplicative) and/or ineffective.

SUMMARY

Accordingly, what is needed is a system or method for storing data on a server that may have a different file storage protocol than the protocol of a local file system while maintaining attributes associated with the data. What is also needed is a system and method for storing data on a server that may have a different file storage protocol without performing unnecessary or ineffective steps.

These and other needs are addressed by the disclosed remote data storage system, which in certain embodiments allows a user to efficiently and effectively store data on a remote storage device that may have a different file storage protocol. In certain embodiments, in response to a request by an application configured for a local file storage protocol to store data remotely, the system uses a filter, that is not specific to the application, having rules instructing how to save the data and its attributes using the file storage protocol of the remote storage device.

In certain embodiments of the present disclosure, a system for storing data is provided. The system includes a processor configured to receive an application request to update a file on a server storage device. The processor is also configured to generate, based on the application request to update the file on the server storage device, a command to update the file on a server storage device. The system also includes a communications module configured to provide, to the server storage device, the command to update the file on the server storage device. The request to update the file on the server storage device is formatted for a file storage protocol of a client storage device. The command to update the file on the server storage device is formatted for a file storage protocol of the server storage device. The command to update the file on the server storage device is not specific to the application generating the application request.

In certain embodiments of the present disclosure, a method for storing a file is provided. The method includes receiving, by a processor, an application request to update a file on a server storage device. The method also includes generating, based on the application request to update the file on the server storage device, a command to update the file on a server storage device, and providing, to the server storage device, the command to update the file on the server storage device. The request to update the file on the server storage device is formatted for a file storage protocol of a client storage device. The command to update the file on the server storage device is formatted for a file storage protocol of the server storage device. The command to update the file on the server storage device is not specific to the application generating the application request.

In certain embodiments of the present disclosure, a computer-readable medium that includes computer-readable instructions for causing a processor to execute a method is provided. The method includes receiving, by a processor, an application request to update a file on a server storage device. The method also includes generating, based on the application request to update the file on the server storage device, a command to update the file on a server storage device, and providing, to the server storage device, the command to update the file on the server storage device. The request to update the file on the server storage device is formatted for a file storage protocol of a client storage device. The command to update the file on the server storage device is formatted for a file storage protocol of the server storage device. The command to update the file on the server storage device is not specific to the application generating the application request.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 2 illustrates exemplary rules for the architecture of FIG. 1.

DETAILED DESCRIPTION

In the following detailed description, numerous specific details are set forth to provide a full understanding of the present disclosure. It will be obvious, however, to one ordinarily skilled in the art that the embodiments of the present disclosure may be practiced without some of these specific details. In other instances, well-known structures and techniques have not been shown in detail not to obscure the disclosure.

Figure 1:
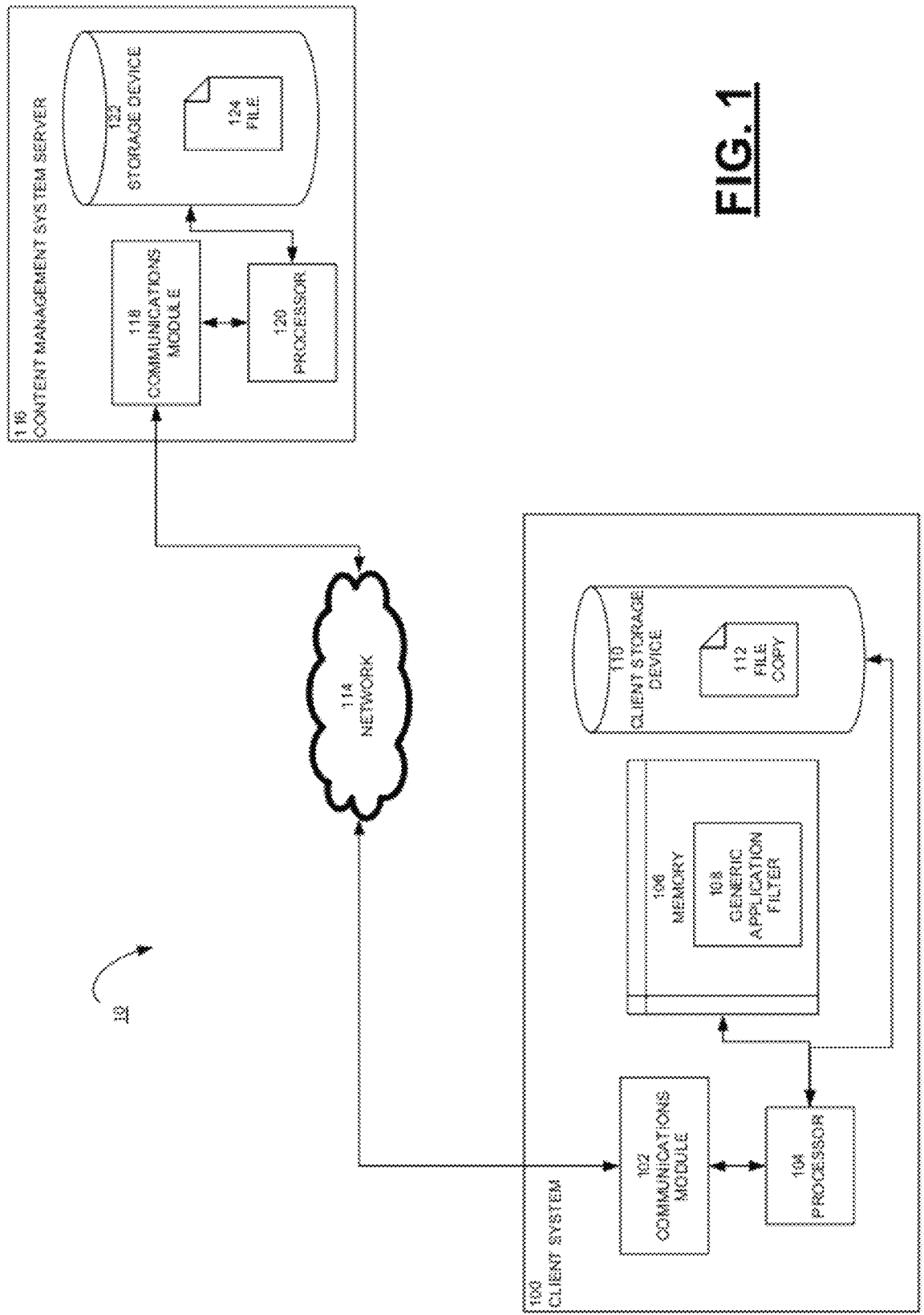
FIG. 1 illustrates an architecture for storing data on a remote device according to certain embodiments of the disclosure.

Referring now to the drawings, FIG. 1 illustrates an architecture 10 for storing data on a remote device according to certain embodiments of the disclosure. The architecture 10 includes a client system 100 connected to a content management system server 116 over a network 114.

The server 116 includes a processor 120, communications module 118, and storage device 122 including a file 124. The server 116 is configured for communication over network 114 (e.g., by client system 100) so that a file 124 of the storage device 122 of the server 116 can be remotely accessed (e.g., by client system 100). The processor 120 of the server 116 is configured to execute instructions, such as instructions physically coded into the processor 120, instructions received from software (e.g., from client system 100 over the network 114), or a combination of both. The server 116 runs a file storage protocol configured to use a protocol for remote management of files. For example, the illustrated server 116 is configured to use WebDAV, which is a set of extensions to the Hypertext Transfer Protocol (HTTP) that allows computer-users to edit and manage files collaboratively on remote World Wide Web servers.

The client system 100 includes a processor 104, communications module 102, memory 106 including a generic application filter 108, and client storage device 110 including a file copy 112 (e.g., in its original form, the file copy 112 is a copy of the file 124 stored in the storage device 122 of the server 116). In certain embodiments, the file copy 112 is stored as a temporary, local copy of the file 124 on the server storage device 122, so that changes to the file copy 112 may ultimately be made to the file 124 on the server storage device 122 (e.g., file synchronization). In certain embodiments, the client system 100 can run a file storage protocol for a file system that is different than the file storage protocol of the server 116, such as, but not limited to, the File Allocation Table (FAT), the New Technology File System (NTFS), the High Performance File System (HPFS), and the Hierarchical File System (HFS).

In certain embodiments, the file 124 and/or the file copy 112 each has at least one attribute, such as, but not limited to, previous versions of the file content, user or application defined file metadata or properties, workflow or business process data, and access control lists. As discussed herein, a file attribute is a property associated with a data file in addition to the file's contents. In certain embodiments, file attributes can include file size, file date/time (e.g., creation time, last-modify time, last-access time), an archive bit (e.g., to show whether the file has been archived), a read-only bit (e.g., to show whether the file is write-protected), a directory bit (e.g., to designate that the file 124 and/or 112 is a directory, not a standard file), a hidden bit (e.g., to hide the file 124 and/or 112 from an ordinary directory listing), a system bit (e.g., to denote whether the file 124 and/or 112 is a system file), and a file history (e.g., file version). The file attributes can be designated by, for example, a file storage protocol of the client system 100 or the server 116.

The processor 104 of the client system 100 is configured to execute instructions. For example, the instructions can be hard coded, received from software stored in memory 106, such as the generic application filter 108, or a combination of both. The generic application filter 108, for example, includes instructions for saving a file to a remote storage device, such as the storage device 122 of the server 116. The instructions include generating, based on a request by an application stored in memory 106 to update the file 124 on the server storage device 122, a command to update the file 124 on the server storage device 122. The request to update the file 124 on the server storage device 122 is formatted for the file storage protocol of the client storage device 100. The generated command is processed by processor 104, and communicated to the server 116 over the network 114 by the communications module 102 of the client system 100. The network 114 can be a public network, such as the Internet, a LAN network, or a corporate WAN network. The network 114 may include features such as a firewall. The command is received by the communications module 118 of the server 116, and processed by the processor 120 of the server 116 on the file 124 of the server storage device 122. The processing of the command generated by the generic application filter 108 preserves at least one of the attributes associated with the file 124 after it is updated on the server storage device 122 (e.g., with the file copy 112 from the client storage device 110).

In certain embodiments, the command to update the file 124 on the server storage device 122 is generated after a predetermined amount of time. For example, one minute after the last request by an application on the client system 100 to update the file 124 on the server storage device 122 has been identified, the command to update the file 124 on the server storage device 122 is generated. In certain embodiments, the predetermined amount of time period is restarted once a change is made to the file copy 112 on the client storage device 110. In certain embodiments, the command to update the file 124 on the server storage device 122 is provided to the server storage device 122 after a predetermined number of requests to update file 124 on the server storage device 122 have been received.

In certain embodiments, in order to properly update the file 124 on the server storage device 122 using the file copy 112 on the client storage device 110, the generic application filter 108 maintains information related to the original server path (on the server storage device 122) of the file 124 and the application (in the memory 106 of the client system 100) that creates or alters the file 124. The original server path information includes the full path to the file 124 and when the file 124 was last synchronized with the server 116. If the file does not exist on the server 116 (e.g., if the file copy 112 is the original and is to be uploaded to the server storage device 122), then a value associated with this information is null.

In certain embodiments, the command to update the file 124 on the server storage device 122 is generated by the generic application filter 108 based on a request received from any number of applications stored in memory 106 of the client system 100. In certain embodiments, requests from certain applications may be excluded from causing the generation of a corresponding file update command, such as applications for which application-specific file update commands are generated. In certain embodiments, after receiving a request from a first application to update the file 124 on the server storage device 122, receipt of requests by other applications to update the same file 124 on the server storage device 122 will be deferred until the file 124 is updated on the server storage device 122 based on the request from the first application, so as to prevent unwanted interference from other applications. For example, requests to alter the namespace of the file 124 (e.g., renaming, deleting, or moving a parent directory of the file 124 on the server storage device 122) will be deferred from other applications.

In certain embodiments, the command generated by the generic application filter 108 to store data on the server storage device 122 (e.g., update the file 124 on the server storage device 122) is based on and/or selected from a plurality of rules. In certain embodiments, the rules are determined by a user and programmed as part of the generic application filter 108. In certain embodiments, the rules are not specific to any specific application on the client system 100, but instead are intended to apply generally to applications of various types on the client system 100. FIG. 2 illustrates a table 200 of exemplary rules 210 to 222 for storing data on a remote device (e.g., server 116) within the architecture 10 of FIG. 1. The table includes a column illustrating the rule number 202, state of an altered file 'A' (e.g., file 124 and/or file copy 112) at synchronization time 204 (e.g., when it is time to update the file 124 on the server storage device 122), the original path 206 of the file 124 on the server storage device 124, and the action 208 representing the rule on how to update the file 124 on the server storage device 122.

Rule one 210 reflects a state where at the time the command to update the file 124 is generated by the generic application filter 108 a file 124 on the server storage device 122 exists at a first location ("first server location") and a file copy 112 exists on the client storage device 110 at a first location ("first client location"). In this state, the generic application filter 108 instructs the processor 104 via the command to store the file copy 112 on the server storage device 122 at the first server location on the server storage device 122 by overwriting the file 124 at the first server location. By way of example, and with reference to FIG. 3, an exemplary flow chart 300 for storing data on a server 116 within the architecture 10 of FIG. 1, rule one 210 is applied when a user 310 in step 301 seeks to modify the file 124 on the server 116 by having an application on the client system 100 in step 302 delete a copy of the file 112 stored locally on the client system 100, and then create a new copy of the file 112 also stored locally on the client system 100. The application on the client system 100 in step 302 generates a request to update the corresponding file 124 on the server 116 with the new copy of the file 112. The generic application filter 108 intercepts the request in step 303, and in step 304, generates a command to update the file 124 on the server 116 by overwriting the file 124 on the server 116 with the newly created copy of the file 112 from the client system 100, thereby preserving attributes associated with the new file copy 112.

Rule two 212 reflects a state where at the time the command to update the file 124 is generated by the generic application filter 108, a file 124 exists on the server storage device 122 at a first server location and at a second server location, and a copy of the file 112 exists on the client storage device 110 at a first location ("first client location"). In this state, if a copy of the file 112 exists on the client storage device 110 at a second location ("second client location"), then the generic application filter 108 instructs the processor 104 via the command to store the file copy 112 on the server storage device 122 at the first server location by overwriting the file 124 at the first server location, otherwise the generic application filter 108 instructs the processor 104 to store the file copy 112 on the server storage device 122 at the first server location by overwriting the file 124 at the first server location and delete the file 124 on the server storage device 122 at the second server location.

Figure 3:
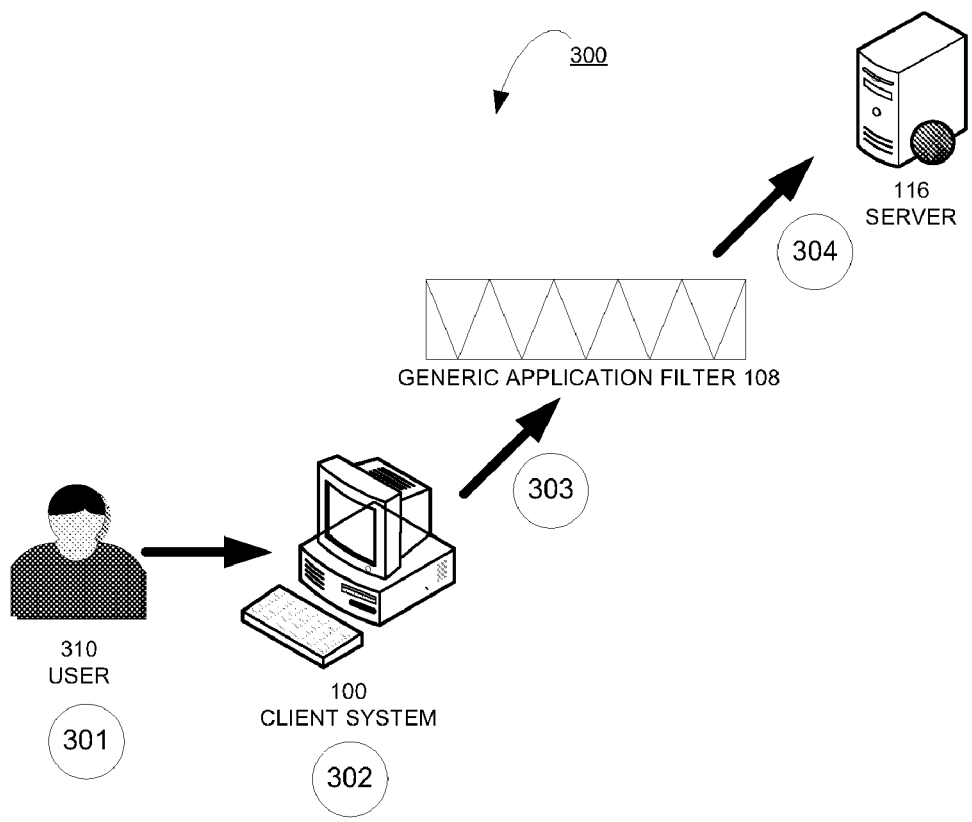
FIG. 3 illustrates an exemplary flow chart for storing data on a remote device within the architecture of FIG. 1.

By way of example, and with reference to FIG. 3, rule two 212 is applied when a user 310 in step 301 seeks to modify the file 124 on the server 116 by having an application on the client system 100 in step 302 delete a copy of a file 112 stored at a first client location locally on the client system 100, and then replace it with a different, second file moved from a second client location. The application on the client system 100 in step 302 generates a request to update the corresponding file 124 on the server 116 with the second file, now considered file copy 112. The generic application filter 108 intercepts the request in step 303, and in step 304 generates a command to update the file 124 on the server 116 by placing a file copy 112 (i.e., the second file) on the server storage device 122 at a corresponding first server location, and delete the second file copy from a corresponding second server location on the server storage device 122, thereby preserving attributes associated with the new file 124 on the server 116.

Rule three 214 reflects a state where at the time the command to update the file 124 is generated by the generic application filter 108 a copy of the file 112 exists on the client storage device 110 and a file 124 exists on the server storage device 122. In this state, the generic application filter 108 instructs the processor 104 via the command to store the file copy 112 on the server storage device 122. By way of example, and with reference to FIG. 3, rule three 214 is applied when a user in step 301 seeks to modify the file 124 on the server 116 by having an application on the client system 100 in step 302 delete a copy of a file 112 stored at a first client location locally on the client system 100, and then replace it with a different, second file copied from a second client location. The application on the client system 100 in step 302 generates a request to update the corresponding file 124 on the server 116 with the second file, now considered file copy 112. The generic application filter 108 intercepts the request in step 303, and in step 304 generates a command to update the file 124 on the server 116 by placing a file copy 112 (i.e., the second file) on the server storage device 122 at a corresponding first server location (as a new file 124), thereby preserving attributes associated with the new file 124 on the server 116.

Rule four 216 reflects a state where at the time the command to update the file 124 is generated by the generic application filter 108 a copy of the file 112 exists on the client storage device 110 at a first client location, but a corresponding file 124 does not exist on the server storage device 122. In this state, the generic application filter 108 instructs the processor 104 via the command to store the file copy 112 on the server storage device 122 at the first server location. Rule five 218 reflects a state where at the time the command to update the file 124 is generated by the generic application filter 108 a file 124 exists on the server storage device 122 at a second server location and a copy of the file 112 exists on the client storage device 110 at a first client location. In this state, if a copy of the file 112 exists on the client storage device 110 at a second client location, then the generic application filter 108 instructs the processor 104 via the command to store the file 112 on the server storage device 122 at the first server location, otherwise the generic application filter 108 instructs the processor 104 via the command to move the file 124 on the server storage device 122 from the second server location on the server storage device 122 to the first server location on the server storage device 122.

By way of example, and with reference to FIG. 3, rules four 216 and five 218 are applied when a user in step 301 seeks to modify the file 124 on the server 116 by having an application on the client system 100 in step 302 move a copy of a file 112 stored locally on the client system 100 from a first client location to a second client location, and then copy the file copy 112 at the second client location to a third client location. The application on the client system 100 in step 302 generates a request to update (or synchronize with) the server 116. The generic application filter 108 intercepts the request in step 303, and in step 304 generates a command to update the file 124 on the server 116 by moving file 124 from a first server location to a second server location (corresponding to the first and second client locations on the client 100), and then placing a copy of file 112 in a third server location (corresponding to the third client location on the client 100) on the server 116.

Rule six 220 reflects a state where at the time the command to update the file 124 is generated by the generic application filter 108 a file 124 exists on the server storage device 122 at a first server location and a copy of the file 112 was previously deleted from the client storage device 110 at a first client location. In this state, the generic application filter 108 instructs the processor 104 via the command to delete the file 124 on the server storage device 122 at the first server location. By way of example, and with reference to FIG. 3, rule six 220 is applied when a user in step 301 seeks to modify the file 124 on the server 116 by having an application on the client system 100 in step 302 delete a copy of a file 112 stored locally on the client system 100. The application on the client system 100 in step 302 generates a request to update (or synchronize with) the server 116. The generic application filter 108 intercepts the request in step 303, and in step 304 generates a command to update the server 116 by deleting the file 124 on the server 116.

Rule seven 222 reflects a state where at the time the command to update the file 124 is generated by the generic application filter 108 a file 124 does not exist on the server storage device 122 at a first server location, and a copy of the file 112 was previously deleted from the client storage device 110 at a first client location. In this state, if a file 124 exists on the server storage device 122 at a second server location and a copy of the file 112 does not exist on the client storage device 110 at a second client location, then the generic application filter 108 instructs the processor 104 via the command to delete the file 124 on the server storage device 122 at the second server location. By way of example, and with reference to FIG. 3, rule seven 222 is applied when a user in step 301 seeks to modify the file 124 on the server 116 by having an application on the client system 100 in step 302 delete a copy of a file 112 stored locally on the client system 100. The application on the client system 100 in step 302 generates a request to update (or synchronize with) the server 116. The generic application filter 108 intercepts the request in step 303, and in step 304 generates a command to update the server 116 by deleting the file 124 from a second server location on the server 116.

In certain embodiments, if a conflict (e.g., failed write due to lock violation, failed move/copy due to missing server storage device 122 files or change in file contents on the server storage device 122) results from the application of one of the illustrated rules described above, a user prompt is generated to allow the user to resolve the conflict.

Figure 4:
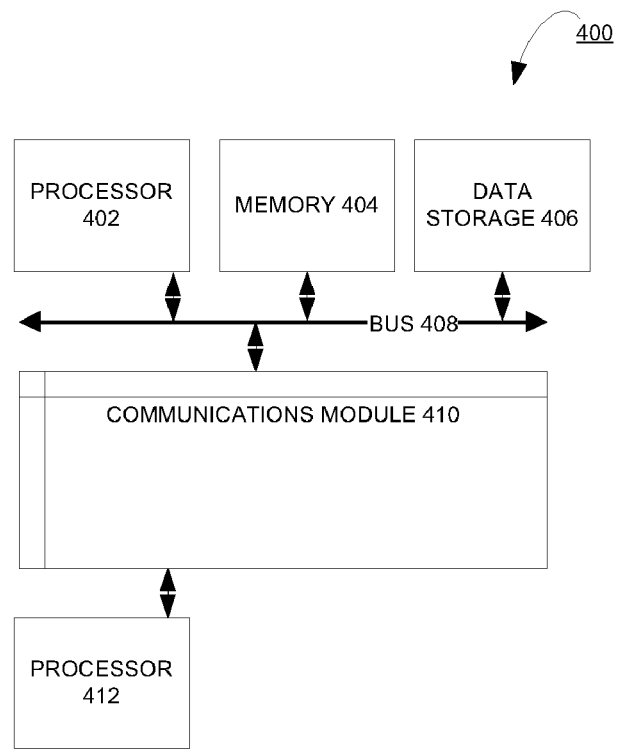
FIG. 4 is a block diagram illustrating an example of a computer system with which the client system of FIG. 1 can be implemented.

FIG. 4 is a block diagram illustrating an example of a computer system 400 with which the client system 100 of FIG. 1 can be implemented. In certain embodiments, the computer system 400 may be implemented using hardware or a combination of software and hardware, either in a dedicated server, or integrated into another entity, or distributed across multiple entities.

Computer system 400 (e.g., system 100 from FIG. 1) includes a bus 408 or other communication mechanism for communicating information, and a processor 402 (e.g., processor 104 from FIG. 1A) coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. Computer system 400 also includes a memory 404 (e.g., memory 106 from FIG. 1), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The instructions may be implemented according to any method well known to those of skill in the art, including, but not limited to, computer languages such as data-oriented languages (e.g., SQL, dBase), system languages (e.g., C, Objective-C, C++, Assembly), architectural languages (e.g., Java), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 404 may also be used for storing temporary variable or other intermediate information during execution of instructions to be executed by processor 402. Computer system 400 further includes a data storage device 406 (e.g., client storage device 110 from FIG. 1), such as a magnetic disk or optical disk, coupled to bus 408 for storing information and instructions. Computer system 400 may be coupled via communications module 410 to a device 412, such as a CRT or LCD for displaying information to a computer user. The communications module 410 can be any input/output module.

According to one aspect of the present disclosure, a client system 100 can be implemented using a computer system 400 in response to processor 402 executing one or more sequences of one or more instructions contained in memory 410. Such instructions may be read into memory 410 from another machine-readable medium, such as data storage device 406. Execution of the sequences of instructions contained in main memory 410 causes processor 402 to perform the process steps described herein. One or more processors in a multi-processing arrangement may also be employed to execute the sequences of instructions contained in memory 410. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 406. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The embodiments of the present disclosure provide a system that uses a filter for updating and/or storing data on a remote device with data stored on a local device that has a file storage protocol different than the file storage protocol of the remote device. The filter allows for the preservation of attributes associated with the data stored on the remote device. The filter includes a plurality of rules directed to updating the data stored on the remote device based on requests from applications on the local device.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

While certain aspects and embodiments of the invention have been described, these have been presented by way of example only, and are not intended to limit the scope of the invention. Indeed, the novel methods and systems described herein may be embodied in a variety of other forms without departing from the spirit thereof. The accompanying claims and their equivalents are intended to cover such forms or modifications as would fall within the scope and spirit of the invention.

What is claimed is:

1. A system for storing data comprising:
 a processor configured to receive an application request indicating updating a file on a server storage device, and generate, based on the application request indicating updating the file on the server storage device, a command indicating updating the file on a server storage device; and
 a communications module providing, to the server storage device, the command indicating updating the file on the server storage device,
 wherein the request indicating updating the file on the server storage device is formatted according to a file storage protocol of a client storage device,
 wherein the command indicating updating the file on the server storage device is formatted according to a file storage protocol of the server storage device,
 wherein the command indicating updating the file on the server storage device is not in a format specific to the application generating the application request,
 wherein, responsive to determining that at the time of the command generation a copy of the file exists on the server storage device at a first server location and at a second server location, and a copy of the file exists on the client storage device at a first client location, then:
  responsive to determining that a copy of the file exists on the client storage device at a second client location, then the command indicating updating the file on the server storage device comprises a command to store the file on the server storage device at the first server location which comprises overwriting the copy of the file at the first server location and a command to delete the copy of the file on the server storage device at the second server location, and
 wherein, responsive to determining that at the time of the command generation a copy of the file exists on the server storage device at a second server location and a copy of the file exists on the client storage device at a first client location, then:
  responsive to determining that a copy of the file exists on the client storage device at a second client location, then the command indicating updating the file on the server storage device comprises a command to move the file on the server storage device from the second server location on the server storage device to the first server location on the server storage device.

2. The system of claim 1, wherein the server storage device comprises a file storage protocol that is different than the file storage protocol of the client storage device.

3. The system of claim 1, wherein the file has at least one attribute, and wherein the command indicating updating the file on the server storage device preserves the at least one attribute associated with the file after it is updated on the server storage device.

4. The system of claim 1, wherein, responsive to determining that at the time of the command generation a copy of the file exists on the client storage device at a first client location, then the command indicating updating the file on the server storage device comprises a command to store the file on the server storage device at a first server location.

5. The system of claim 4, wherein at the time of the command generation a copy of the file on the server storage device exists at the first server location, and wherein the command indicating updating the file on the server storage device comprises a command to store the file on the server storage device at the first server location by overwriting the copy of the file at the first server location.

6. The system of claim 1, wherein, responsive to determining that at the time of the command generation a copy of the file exists on the client storage device and a copy of the file exists on the server storage device, then the command indicating updating the file on the server storage device comprises a command to store the file on the server storage device.

7. The system of claim 1, wherein, responsive to determining that at the time of the command generation a copy of the file exists on the server storage device at a first server location and at a second server location, and a copy of the file exists on the client storage device at a first client location, then:
responsive to determining that a copy of the file exists on the client storage device at a second client location, then the command indicating updating the file on the server storage device further comprises a command to store the file on the server storage device at the first server location by overwriting the copy of the file at the first server location.

8. The system of claim 1, wherein, responsive to determining that at the time of the command generation a copy of the file exists on the server storage device at a second server location and a copy of the file exists on the client storage device at a first client location, then:
responsive to determining that a copy of the file exists on the client storage device at a second client location, then the command indicating updating the file on the server storage device further comprises a command to store the file on the server storage device at the first server location.

9. The system of claim 1, wherein, responsive to determining that at the time of the command generation a copy of the file exists on the server storage device at a first server location and a copy of the file was previously deleted from the client storage device at a first client location, then the command indicating updating the file on the server storage device comprises a command to delete the file on the server storage device at the first server location.

10. The system of claim 1, wherein, responsive to determining that at the time of the command generation a copy of the file does not exist on the server storage device at a first server location, and a copy of the file was previously deleted from the client storage device at a first client location, then when a copy of the file exists on the server storage device at the second server location and a copy of the file does not exist on the client storage device at a second client location, then the command indicating updating the file on the server storage device at the comprises a command to delete the file on the server storage device at the second server location.

11. The system of claim 1, wherein the command indicating updating the file on the server storage device is generated after a predetermined amount of time.

12. The system of claim 1, wherein the command indicating updating the file on the server storage device is generated after a predetermined number of requests indicating updating file on the server storage device have been received.

13. The system of claim 1, wherein the file storage protocol of the server storage device comprises at least one of a Web-based Distributed Authoring and Copying (WebDAV) file storage protocol.

14. A method for storing a file comprising:
receiving, by a processor, an application request indicating updating a file on a server storage device;
generating, based on the application request indicating updating the file on the server storage device, a command indicating updating the file on a server storage device; and
providing, to the server storage device, the command indicating updating the file on the server storage device,
wherein the request indicating updating the file on the server storage device is formatted according to a file storage protocol of a client storage device,
wherein the command indicating updating the file on the server storage device is formatted according to a file storage protocol of the server storage device,
wherein the command indicating updating the file on the server storage device is not in a format specific to the application generating the application request,
wherein, responsive to determining that at the time of the command generation a copy of the file exists on the server storage device at a first server location and at a second server location, and a copy of the file exists on the client storage device at a first client location, then:
responsive to determining that a copy of the file exists on the client storage device at a second client location, then the command indicating updating the file on the server storage device comprises a command to store the file on the server storage device at the first server location which comprises overwriting the copy of the file at the first server location and a command to delete the copy of the file on the server storage device at the second server location, and
wherein, responsive to determining that at the time of the command generation a copy of the file exists on the server storage device at a second server location and a copy of the file exists on the client storage device at a first client location, then:
responsive to determining that a copy of the file exists on the client storage device at a second client location, then the command indicating updating the file on the server storage device comprises a command to move the file on the server storage device from the second server location on the server storage device to the first server location on the server storage device.

15. The method of claim 14, wherein the server storage device comprises a file storage protocol that is different than the file storage protocol of the client storage device.

16. The method of claim 14, wherein the file has at least one attribute, and wherein the command indicating updating the file on the server storage device preserves the at least one attribute associated with the file after it is updated on the server storage device.

17. The method of claim 14, wherein, responsive to determining that at the time of the command generation a copy of the file exists on the client storage device at a first client location, then the command indicating updating the file on the server storage device comprises a command to store the file on the server storage device at a first server location.

18. The method of claim 17, wherein at the time of the command generation a copy of the file also exists on the server storage device.

19. The method of claim 18, wherein at the time of the command generation the copy of the file on the server storage device exists at the first server location, and wherein the command indicating updating the file on the server storage device comprises a command to store the file on the server storage device at the first server location which comprises overwriting the copy of the file at the first server location.

20. The method of claim 14, wherein, responsive to determining that at the time of the command generation a copy of the file exists on the server storage device at a first server location and at a second server location, and a copy of the file exists on the client storage device at a first client location, then:
    responsive to determining that a copy of the file exists on the client storage device at a second client location, then the command indicating updating the file on the server storage device further comprises a command to store the file on the server storage device at the first server location by overwriting the copy of the file at the first server location.

21. The method of claim 14, wherein, responsive to determining that at the time of the command generation a copy of the file exists on the server storage device at a second server location and a copy of the file exists on the client storage device at a first client location, then:
    responsive to determining that a copy of the file exists on the client storage device at a second client location, then the command indicating updating the file on the server storage device further comprises a command to store the file on the server storage device at the first server location.

22. The method of claim 14, wherein, responsive to determining that at the time of the command generation a copy of the file exists on the server storage device at a first server location and a copy of the file was previously deleted from the client storage device at a first client location, then the command indicating updating the file on the server storage device comprises a command to delete the file on the server storage device at the first server location.

23. The method of claim 14, wherein, responsive to determining that at the time of the command generation a copy of the file does not exist on the server storage device at a first server location, and a copy of the file was previously deleted from the client storage device at a first client location, then when a copy of the file exists on the server storage device at the second server location and a copy of the file does not exist on the client storage device at a second client location, then the command indicating updating the file on the server storage device at the comprises a command to delete the file on the server storage device at the second server location.

24. The method of claim 14, wherein the command indicating updating the file on the server storage device is generated after a predetermined amount of time.

25. The method of claim 14, wherein the command indicating updating the file on the server storage device is generated after a predetermined number of requests indicating updating file on the server storage device have been received.

26. The method of claim 14, wherein the file storage protocol of the server storage device comprises at least one of a Web-based Distributed Authoring and Copying (WebDAV) file storage protocol.

27. A non-transitory computer-readable medium comprising computer-readable instructions for causing a processor to execute a method comprising:
    receiving, by a processor, an application request indicating updating a file on a server storage device, wherein the file has at least one attribute;
    generating, based on the application request indicating updating the file on the server storage device, a command indicating updating the file on a server storage device; and
    providing, to the server storage device, the command indicating updating the file on the server storage device,
    wherein the request indicating updating the file on the server storage device is formatted according to a file storage protocol of a client storage device,
    wherein the command indicating updating the file on the server storage device is formatted according to a file storage protocol of the server storage device,
    wherein the command indicating updating the file on the server storage device is not in a format specific to the application generating the application request,
    wherein, responsive to determining that at the time of the command generation a copy of the file exists on the server storage device at a first server location and at a second server location, and a copy of the file exists on the client storage device at a first client location, then:
        responsive to determining that a copy of the file exists on the client storage device at a second client location, then the command indicating updating the file on the server storage device comprises a command to store the file on the server storage device at the first server location which comprises overwriting the copy of the file at the first server location and a command to delete the copy of the file on the server storage device at the second server location, and
    wherein, responsive to determining that at the time of the command generation a copy of the file exists on the server storage device at a second server location and a copy of the file exists on the client storage device at a first client location, then:
        responsive to determining that a copy of the file exists on the client storage device at a second client location, then the command indicating updating the file on the server storage device comprises a command to move the file on the server storage device from the second server location on the server storage device to the first server location on the server storage device.

* * * * *